Aug. 17, 1965  K. E. MULLENGER  3,201,584
HOT BOX DETECTOR
Filed Nov. 21, 1961
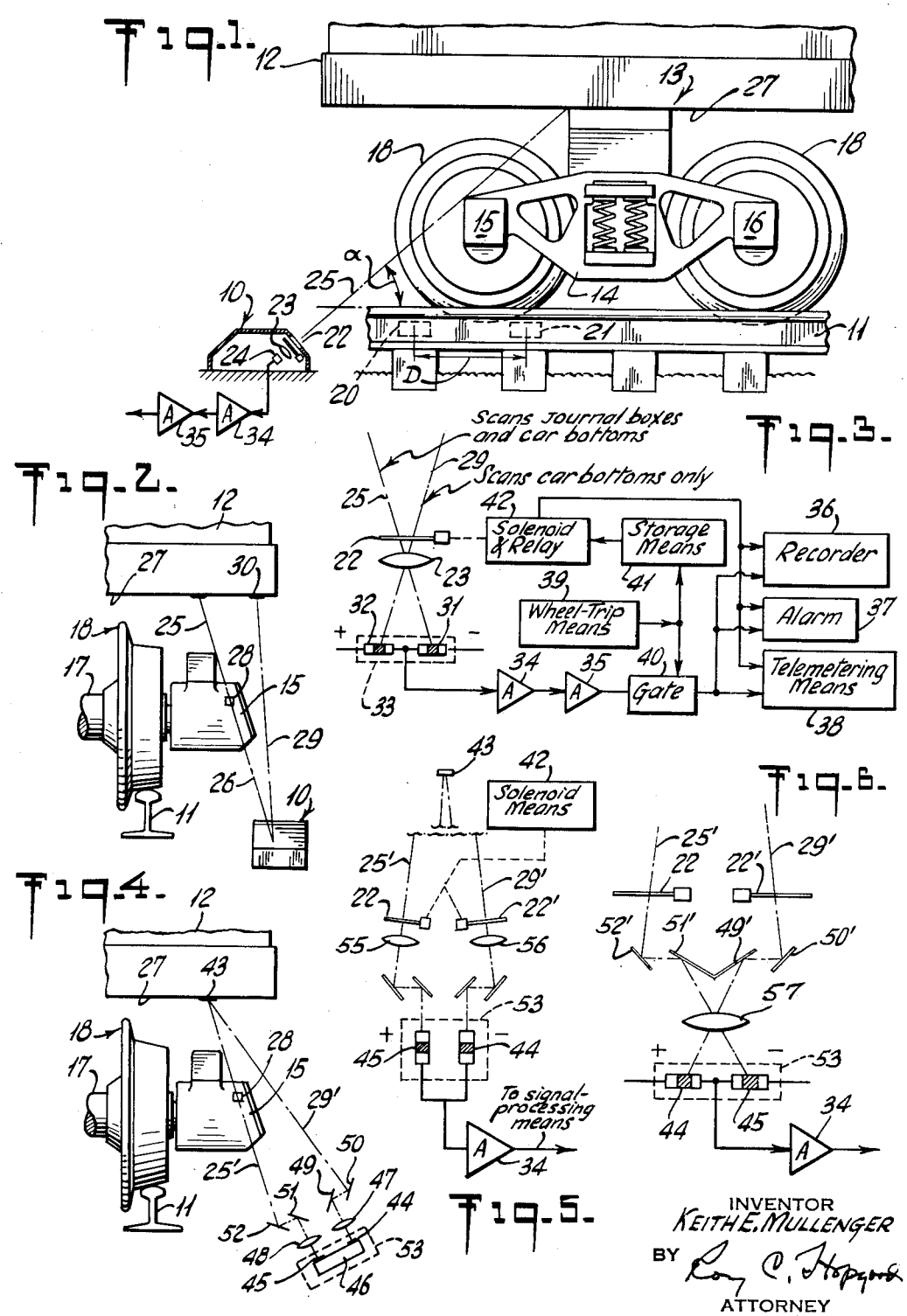
INVENTOR
KEITH E. MULLENGER
BY
ATTORNEY

United States Patent Office 3,201,584
Patented Aug. 17, 1965

3,201,584
HOT BOX DETECTOR
Keith E. Mullenger, Mamaroneck, N.Y., assignor to Servo Corporation of America, Hicksville, N.Y., a corporation of New York
Filed Nov. 21, 1961, Ser. No. 153,998
11 Claims. (Cl. 246—169)

My invention relates to an improved hot-box detector of the variety which is mounted alongside a railroad track and which automatically responds to the passage of an overheated journal box. The invention is particularly concerned with the improvements to hot-box detectors of the variety covered in Gallagher et al. Patent 2,880,309, issued March 31, 1959.

In hot-box detectors of the character indicated, there is the constant assumption that heat from a passing journal box which is scanned by the device will be adequately and accurately observed in contrast to the heat radiation from the underside of a car. For most ordinary circumstances, this is certainly true, and devices of the character covered in Gallagher et al. patent noted above are most certainly highly useful devices. There are occasions, however, when freak conditions will develop to momentarily dislodge the background heat reference established by the underside of the car. For example, an unexpected hot or cold spot in the scan path along the bottom of the car and immediately preceding the scan of a journal box will momentarily dislodge the background reference which would normally be established by the bottom of the car, so that the succeeding scan signal developed upon observation of the journal box may be in error as a result.

One of the reasons why the above-noted error develops in the journal box signal is believed to be not so much attributable to the detector element itself as to the type of amplifier used in conjunction with the detector. Commercially, these amplifiers are of the A.-C. variety, being capacitance-coupled, meaning that amplifier output at any given instant will reflect the instantaneous input signal only in terms of the just-preceding level of that input signal. Thus, with present hot-box detectors it is necessary to make sure of a quiescent background level (assumed to exist at the bottom of the car) against which the desired signal from the journal box can be most advantageously observed.

It is an object of the invention to provide a device which may substantially reduce the above-noted difficulties and which may thus provide improved performance in a hot-box detector system.

It is a specific object to provide improved hot-box detector system in which the feeding of undesired transient signals to the amplifier system will be avoided, or at least materially reduced.

Other objects and various further features of novelty of the invention will be pointed out or will occur to those skilled in the art from a reading of the following specification in conjunction with the accompanying drawings. In said drawings, which show, for illustrative purposes only, preferred forms of the invention:

FIG. 1 is a diagrammatic side view of a railroad track and parts of a car, including journal boxes, in relation to the housing and major components of a hot-box detector system of the character indicated;

FIG. 2 is a view in elevation taken in a plane perpendicular to the track and showing relative positions of the parts of FIG. 1;

FIG. 3 is an electrical diagram schematically indicating the relation of electrical and optical parts of the system of FIGS. 1 and 2;

FIG. 4 is a view similar to FIG. 2 but illustrating a modification; and

FIGS. 5 and 6 are diagrams similar to FIG. 3 to illustrate further modifications.

Briefly stated, the invention contemplates avoiding the above-noted difficulty by employing two detector elements which shall be respectively associated with different scanning axes; both of these axes are aligned for simultaneously scanning essentially the undersides of passing rolling stock, but only one axis to the exclusion of the other is aligned to scan the journal boxes themselves. Preferably, the alignment of these two axes is such that the parts of the car bottoms scanned by the two detectors are substantially the same or closely adjacent. Thus, one detector scanning axis is preferably located outwardly of the rail more than is the other.

Referring to FIGS. 1, 2 and 3 of the drawings, my invention is shown in application to a hot-box detector device fixedly mounted alongside one of the rails 11 of a railroad track, accommodating rolling stock such as the freight car 12 having a truck 13 at one end. The truck comprises a frame 14 with spaced journal boxes 15–16 at the respective longitudinal ends thereof for supporting corresponding ends of axles 17 (FIG. 2). The flanges of wheels 18 on axles 17 may operate magnetic wheel-trip devices, suggested at 20–21 as having a spacing D along the track, for a purpose and in a manner described in greater detail in said Patent 2,880,309.

The detecting device 10 may include shutter mechanism 22, optical focusing means 23, and an infrared detector element 24 on an optical alignment axis 25 which may be upwardly inclined at an angle $\alpha$ with respect to the track and directed generally in the longitudinal direction of the track.

In accordance with current practice, it is preferred that the alignment axis 25 shall be toed-in towards the track at an acute angle (as suggested in FIG. 2) so that the scan path 26 will run along the underside 27 of the freight-car bottom except for such times as the journal boxes intercept the axis 25. With such orientation, and for trailing-aspect viewing, the image 28 of the detector will scan up the trailing side of the box 15; similarly, for forward-aspect viewing, the same path will be traced down the forward side of the journal box 15.

In accordance with the invention, a second detector element is employed in conjunction with the same or a similar optical system, and this second element is effectively on an alignment axis 29 which is spaced from the axis 25 but which also scans the underside of passing rolling cars, as suggested at 30 in FIG. 2. Preferably, the axes 25–29 are spaced from each other in the direction transverse to the track, as suggested in FIG. 2, so that the side view of FIG. 1 would show both the axis 29 and the axis 25 on the same alignment. Stated in other words, the axes 25–29 define a plane which intercepts the car bottom 27 on a line, and that line is generally transverse to the direction of the track. This assures that, when one of the scan axes 25 runs off the bottom of one car and up the end surface of that car, so also will the other scan axis 29 run off the bottom of the car and up the end of the same car, thus assuring that individual responses of both detectors will be the same for that part of the car.

In FIG. 3, I show my intention to differentially combine the electrical outputs of the two detector elements which have been separately designated 31–32. These may be thermistor-bolometer elements or flakes, and their sensitive areas are shown by shading. It is these sensitive areas which are effectively imaged by the optical means or lens 23 along the two different response axes 25–29. In the form shown, axis crossover occurs at 23 by reason of the common optical element 23 for both axes 25–29. Preferably, both detector elements 31–32 are mounted on a common heat sink, suggested by dashed outline 33, so as to render background conditions as common as possible for both detector elements. Elements 31-32 are oppositely polarized, as suggested by plus and minus designations, and differential evaluation is taken from their common connection, to preamplifier 34, signal amplifier 35, thence to suitable signal-processing means for recording, alarm, or telemetering purposes, as suggested at 36, 37, 38, respectively.

As explained in said Gallagher et al. patent, the wheel-trip means 20-21 may operate gating means so as to assure passage to the recorder 36 of only signals representative of a scanned journal box. The blocks 39-40 suggest the mechanism for accomplishing this, and storage means 41 in conjunction with solenoid and relay means 42 are employed to operate the shutter 22 and to enable or activate the output devices 36-37-38, as described in said patent.

In the arrangement of FIG. 4, the organization is generally similar to that which has already been described, except that instead of having the two axes of scan diverge in the direction away from the detector housing, they are caused to converge, as suggested for the axes 25'-29' in FIG. 4. The extent of convergence is shown in FIG. 4 to be such that preferably these two axes intersect at a point 43 which is substantially at the expected plane of most car bottoms, thus assuring that whatever heat signals are derived by detector 44 for scanning along axis 29' will also be derived by detector 45 for scanning along the axis 25', as long as there is no journal box intercepting the scan path of the latter axis.

To produce the converging axes 25'-29', I show in FIG. 4 arrangement of detectors 44-45 on a common heat sink 46 but sufficiently spaced so that separate optical focusing devices, such as lenses 47-48, may coact with a first folding mirror system 49-50 for the axis 29', and with a second folding mirror system 51-52 for the axis 25'. The base spread between mirrors 50-52 is of course preferably such that under no circumstances will the scan developed by axis 29' intercept a journal box, whereas, of course, the scan for axis 25' is such as to intercept all journal boxes. The dotted outline 53 suggests that, as with the case of the other described embodiments of the invention, a single capsult or cell may be employed to house both detector elements.

The arrangement of FIG. 5 is generally similar to that of FIG. 4 except that the separate optical elements 55-56 for the axes 25'-29' are outside the folding mirror system, and the spacing may be such that two separate shutter devices 22' may be desired or necessary for accommodating the two axes. These shutter devices are shown operated by a common solenoid and relay device 42, as previously described.

In the arrangement of FIG. 6 the converging axis development as described for axes 25'-29' is achieved by a single optical element 57 for the case of the two spaced detector elements 44-45. Crossover of the axes at the lens 57 is at a sufficiently wide angle that the central folding-mirror elements 49'-51' will clearly segregate the responses of the two cells, and a relatively wide base (e.g. 5 to 15 inches) between axes 25'-29' may be established.

In use, the invention provides a means of assuring that the differentially combined outputs of the two detectors will reflect properly referenced observation of heat signals on a journal box, even for the eventuality that an unusually hot or an unusually cold spot will have been scanned immediately preceding a scan of the journal box itself. If a local hot spot is encountered on the bottom of the car or at the end of a car, it would, in the present commercial case of response on axis 25 alone, naturally mean a greater signal output from the preamplifier system, and this will be something different from the normal background reference established by the bottom of the car. Any heat from an immediately succeeding journal box would thus ordinarily be detected on a recorder as a signal of lesser or no magnitude, with reference to the unusually hot spot preceding journal box signal.

However, according to the invention the second scanning axis (29 or 29') will have developed exactly the same response to this hot spot preceding the journal box. Whatever the journal-box output in the first axis 25, it will be compared against the correct car bottom signal, and the differential connection of the two detector elements will assure that the undesired heat signal will not affect the amplifier system; thus greater fidelity of hot-box detection will result. Furthermore, for the situation in which improved detectors and improved preamplifier systems become more nearly instantaneously responsive and do not depend so much on the immediate past preceding the scanning of the journal box, the steady reference developed by scan on the axis 29 or 29' will be constantly available for instantaneous evaluation against the scan on the journal box.

It will be seen that the detector of my invention illustrates a method of hot-box scanning whereby the present excellent performance of hot-box detectors according to Gallagher Patent 2,880,309, may be even further improved.

While the foregoing description sets forth the principles of the invention in connection with specific apparatus, it is to be understood that this description is made only by way of example and not as a limitation of the scope of the invention as defined in the accompanying claims.

I claim:

1. In combination, a length of railroad track, a railroad car on said track, said car having a body and an axle and journal boxes connecting said axles to said body, and a hot-box detecting device fixedly mounted alongside one of the rails of said track and below the level of said axle, said detecting device comprising first and second spaced heat-sensitive detector elements each of which produces an electrical signal in response to incident radiant energy, optical means imaging said detector elements along separate upwardly inclined axis directed at the underside of the body of said car and generally in the longitudinal direction of said track, the aspect of the first of said axes being such as to image said first detector element on corresponding sides of journal boxes on that side of the track defined by said one rail, the aspect of the second of said axes being such as to image said second detector element on the underside of the body of said car at all times that said first detector element is imaged on a journal box, and means continuously differentially evaluating the outputs of said detector elements with respect to each other.

2. The combination of claim 1, in which the plane defined by both said axes intersects the bottom of a car on a line substantially transverse to the alignment of the track, whereby the paths scanned by said respective detector elements will concurrently observe the bottom of the car and, between cars, will concurrently observe the ends of cars.

3. The combination of claim 1, in which both said axes diverge in the direction away from said detecting device.

4. The combination of claim 1, in which both said axes converge in the direction away from said detecting device.

5. In combination, a length of railroad track and a hot-box detecting device fixedly mounted alongside one of the rails of said track and below the level of passing axles, said detecting device comprising first and second spaced heat-sensitive detector elements, each of which produces an electrical signal in response to incident radiant energy, optical means imaging said detector elements along separate upwardly inclined axes directed at the underside of the body of said car, said axes being spaced from each other at said detecting device and converging toward each other in the direction away from said detecting device, the intersection of said axes being substantially at the level of the underside of passing rolling stock, one of said axes being closer to the track than the other and the spacing of said axes being such that one of said detector elements will scan the underside of cars in alternation with passing journal boxes while the other of said detector elements scans the underside of cars to the exclusion of journal boxes, and means continuously directly coupled to both said detector elements for continuously differentially evaluating the outputs of said detector elements with respect to each other.

6. The method of detecting overheated journal boxes on moving railroad rolling stock, which comprises scanning the infrared radiation from the undersides of passing rolling stock in alternation with that from the sides of journal boxes on said rolling stock to develop a first electrical signal, scanning the infrared radiation from the undersides of such rolling stock to the exclusion of that from the sides of journal boxes to develop a second electrical signal concurrently with development of said first signal, and continuously differentially evaluating said first and second electrical signals to produce an ouput indicative of response to said journal boxes alone.

7. The method of claim 6, wherein essentially the same scan paths are employed to develop said first and second signals.

8. A hot-box detecting device adapted to be mounted fixedly alongside a railroad track and to scan infrared radiation from a passing railroad train, comprising two infrared detector elements mounted on a common heat sink and developing electrical output signals responsive to infrared radiation impinging on said elements, optical means separately imaging said detector elements along separate scanning axes which are spaced one from the other in a direction generally transverse to the track, whereby one of said axes is further away from one side of the track than is the other of said axes, the alignment of both axes being directed at the undersides of passing rolling stock but such that the axis nearer to the track will additionally scan parts of passing journal boxes whereas the alignment of the axis further away from the track will scan the undersides of cars to the exclusion of journal boxes, and means continuously and differentially directly coupled to said detector elements for combining the outputs of said detector elements.

9. A hot-box detecting device adapted to the mounted fixedly alongside a railroad track and to scan infrared radiation from a passing railroad train, comprising two spaced infrared detector elements developing electrical output signals responsive to infrared radiation impinging on said elements, optical means including folding mirrors separately imaging said detector elements along separate scanning axes which are spaced one from the other in a direction generally transverse to the track whereby one of said axes is further away from one side of the track than is the other of said axes, the alignment of both axes being directed at the undersides of passing rolling stock but such that the axis nearer to the track will additionally scan parts of passing journal boxes whereas the alignment of the axis further away from the track will scan the undersides of cars to the exclusion of journal boxes, and means continuously and directly coupled to the outputs of said detector elements for differentially combining the output of said detector elements.

10. In combination, a length of railroad track and a hot-box detecting device fixedly mounted alongside one of the rails of said track and below the level of passing axles, said detecting device comprising first and second spaced heat-sensitive detector elements, each of which produces an electrical signal in response to incident radiant energy, optical means imaging said detector elements along separate upwardly inclined axes directed at the underside of the body of said car and spaced from each other in a direction generally transversely of the track such that one of said detector elements will scan the underside of cars in alternation with passing journal boxes while the other of said detector elements scans the underside of cars to the exclusion of journal boxes, means continuously and directly coupled to both said detector elements for differentially combining the outputs of said detector elements, and an amplifier connected to said last-defined means.

11. The combination of claim 10, in which said amplifier is of the A.-C. variety.

References Cited by the Examiner

UNITED STATES PATENTS

| 2,710,559 | 6/55 | Heitmuller et al. | 246—169 |
| 2,880,309 | 3/59 | Gallagher et al. | 246—169 |
| 3,065,347 | 11/62 | Bossart | 246—169 X |

FOREIGN PATENTS 613,116  11/48  Great Britain.

EUGENE G. BOTZ, *Primary Examiner.*

LEO QUACKENBUSH, *Examiner.*